US008023432B2

(12) United States Patent
Herzog

(10) Patent No.: US 8,023,432 B2
(45) Date of Patent: Sep. 20, 2011

(54) COST REDUCTION OF NAT CONNECTION STATE KEEP-ALIVE

(75) Inventor: Shai Herzog, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/716,929

(22) Filed: Mar. 12, 2007

(65) Prior Publication Data

US 2008/0225865 A1    Sep. 18, 2008

(51) Int. Cl.
    *H04L 12/28* (2006.01)
(52) U.S. Cl. ......................... 370/254; 370/401
(58) Field of Classification Search ................ None
    See application file for complete search history.

(56) References Cited

U.S. PATENT DOCUMENTS

| | | | |
|---|---|---|---|
| 6,212,175 B1 | 4/2001 | Harsch | |
| 6,538,988 B1 * | 3/2003 | Natarajan et al. | 370/216 |
| 7,088,698 B1 | 8/2006 | Harsch | |
| 2003/0009561 A1 | 1/2003 | Sollee | |
| 2003/0055978 A1 | 3/2003 | Collins | |
| 2003/0212801 A1 * | 11/2003 | Yang-Huffman | 709/228 |
| 2004/0133692 A1 | 7/2004 | Blanchet et al. | |
| 2004/0264381 A1 | 12/2004 | Banerjee et al. | |
| 2005/0050209 A1 | 3/2005 | Main, II | |
| 2005/0188098 A1 | 8/2005 | Dunk | |
| 2006/0029083 A1 | 2/2006 | Kettlewell et al. | |
| 2006/0072569 A1 | 4/2006 | Eppinger et al. | |
| 2006/0126596 A1 * | 6/2006 | Shieh et al. | 370/352 |
| 2006/0182141 A1 | 8/2006 | Duggirala et al. | |
| 2008/0039032 A1 * | 2/2008 | Haumont | 455/115.1 |
| 2008/0159163 A1 * | 7/2008 | Valli | 370/252 |

OTHER PUBLICATIONS

"Automatic Tunneling Setup for/with IPv6 (ATS6)", http://www3.ietf.org/proceedings/06mar/slides/isoftwire-9.pdf.
Audet et al., "NAT Behavioral Requirements for Unicast UDP", Date: Jan. 2005, http://scm.sipfoundry.org/rep/ietf-drafts/behave/draft-ietf-behave-nat-udp-00.html.
Levkowetz et al., "Mobile IP Traversal of Network Address Translation (NAT) Devices", Date: Apr. 2003, http://www.rfc-editor.org/rfc/rfc3519.txt.
International Search Report, mailed Aug. 12, 2008, 11 pages.

* cited by examiner

*Primary Examiner* — Chirag G Shah
*Assistant Examiner* — Daniel Mitchell

(57) ABSTRACT

Keep-alive processing for NAT devices and reducing power consumption in wireless clients. A server driven keep-alive mechanism facilitates keep-alive messages to a NAT device currently providing a connection to a mobile client to refresh the NAT state, thereby reducing or eliminating power consumption in a wireless device to respond to the connection with keep-alive packets. In one instance, keep-alive packets are sent to the NAT device to reset the NAT timeout timer, and then to the mobile client. The client responds only when expected keep-alive packets are not received at the client. In another instance, keep-alive packets reset the NAT timer to maintain the connection but are dropped or self-destruct before reaching the mobile client thereby providing the optimum power conservation in the mobile device. Thus, the client is not forced into extra client activity to send or receive wireless data, thereby draining the battery.

9 Claims, 10 Drawing Sheets

COST REDUCTION OF NAT CONNECTION STATE KEEP-ALIVE

BACKGROUND

Technological advances in computing devices and networking facilitate access to a wide variety of information and services allowing access from virtually anywhere in the world. Virtual offices are becoming more popular since the work that needs to be done can be performed from most locations. For example, home networks are becoming more commonplace as residents acquire more communications and/or computing devices for accessing networks. Similarly, businesses employ subnetworks behind routers for intranet services. Rather than subscribe to separate IP addresses for each network device, a technique called network address translation (NAT) allows multiple IP nodes behind the router to share a single public IP address. In other words, a standard is provided that allows one set of unregistered IP addresses to be used for internal network traffic and another set of IP address to be used for external or public traffic. This allows internal network addresses to be shielded from public access (e.g., via the Internet).

A NAT router, for example, includes an outside interface to the public network and an inside interface to the internal network or domain. When a packet leaves the domain, the NAT device translates the local source address into a globally unique address for use on, for example, the Internet. When a packet enters the domain from the Internet, the NAT router translates the globally unique address into a local address. When a sharing node of the domain sends outbound traffic, the NAT forwards the traffic and creates a reverse mapping entry for the sharing node in an address mapping and/or port mapping database or table. This reverse entry is used to redirect responses back into the domain to the correct sharing node.

Typically, NAT devices employ a timeout timer having a configurable timeout period for mapping state. If a specific entry is not used by inbound or outbound traffic for longer than the timeout period, a NAT timer expires and the entry is purged. Once the entry is purged, the sharing node behind the NAT can no longer be reached over this connection and a new connection must be initiated (e.g., by the sharing node). A common mechanism to prevent the NAT timer from timing out (or expiring) is known as "keep-alive" or "heartbeat" processing. Under keep-alive, useless traffic is generated over the connection at shorter intervals than the NAT timeout period to reset the timer and thereby, keep the connection active. When it comes to portable devices that use battery power as the principal power source (e.g., smart phones) conventional keep-alive techniques drain device battery life and generate significant wireless activity to keep the connection alive.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a technique whereby a server driven keep-alive mechanism facilitates keep-alive messages to a NAT device currently providing a connection to a client to refresh the NAT state. Accordingly, the cost associated with power consumption by a battery-powered mobile device, for example, on the connection and in the private network is reduced by not requiring the client to transmit keep-alive packets or to respond at all. In other words, the server facilitates keep-alive management to the NAT device currently providing the connection thereby reducing or eliminating power consumption in the wireless device.

In one methodology, keep-alive packets are sent to the NAT device to reset the NAT timeout timer, and then to the mobile client. The client responds only when expected keep-alive packets are not received at the client. In another methodology, keep-alive packets reset the NAT timer to maintain the connection but are dropped or self-destruct before reaching the mobile client thereby providing the optimum power conservation in the mobile device. Thus, the client is not forced into extra client activity to send or receive wireless data, thereby draining the battery.

In yet another implementation, the keep-alive server interrogates the NAT device and determines which methodology to employ for the NAT device. Additionally, connection keep-alive can be managed by switching between the methodologies based on current performance of the connection.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
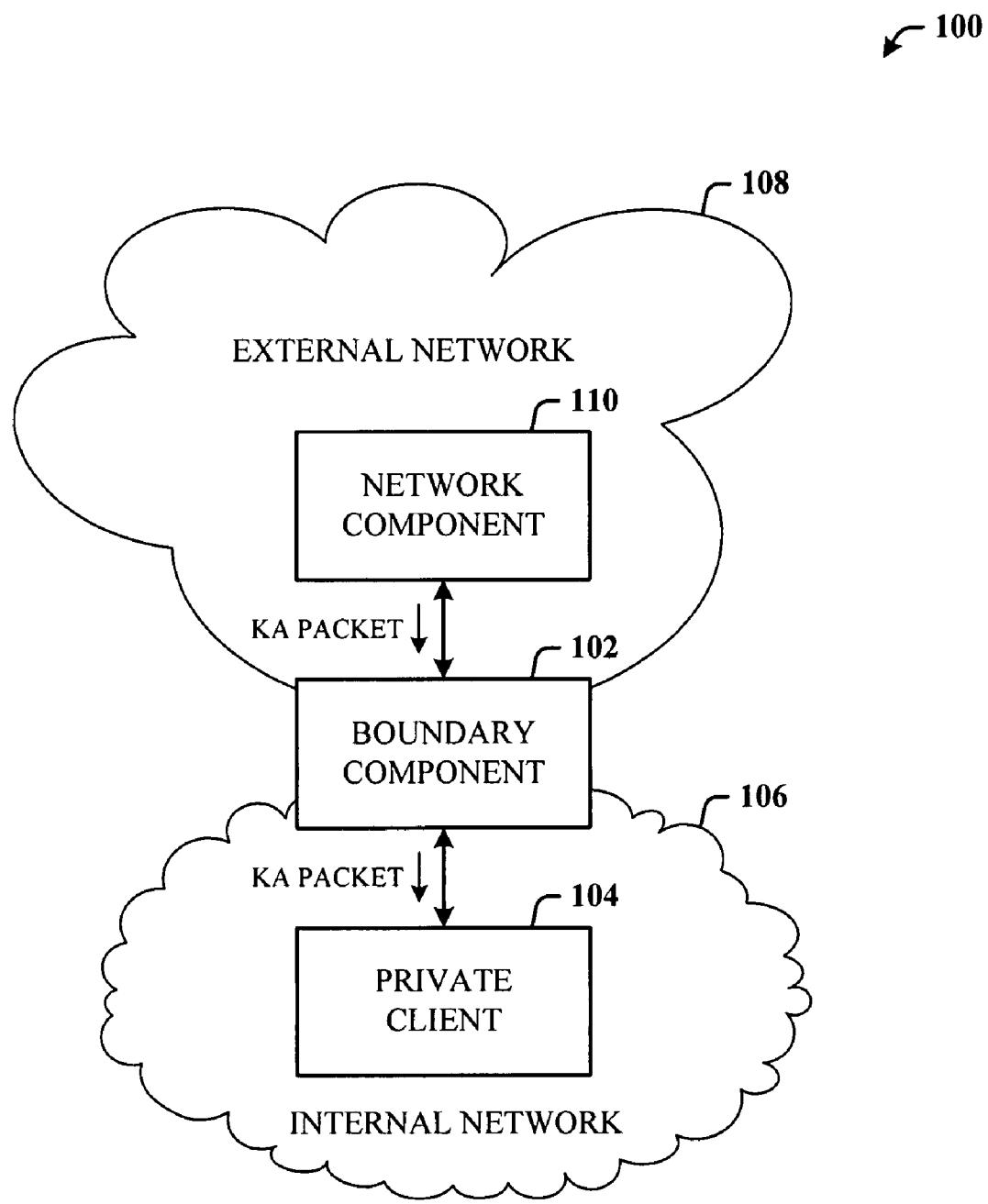
FIG. 1 illustrates a computer-implemented system that facilitates keep-alive connection management in a network boundary component.

The architecture is a technique for keeping a connection alive between an external network (e.g., the Internet) and a mobile-capable battery-powered device (e.g., a cell phone, portable computer) of a private network (e.g., a home, intranet, Mobile Operator networks) via a network address translation (NAT) component (e.g., a NAT device). The external network (e.g., a server) sends keep-alive packets to the NAT component to reset a timer thereby maintaining the connection through the NAT component. Accordingly, the mobile-capable device does not need to expend extra power and network traffic to keep the connection alive thereby reducing the costs associated with device power expenditure and network traffic.

In one implementation, the keep-alive packets are passed through the NAT component to the mobile-capable device. If the device fails to receive the packets, only then does the device respond to the external network (e.g., via the NAT component or via out-of-band (OOB) signaling) to send keep-alive packets to maintain the connection. In another implementation, keep-alive packets are sent to the NAT component, only, and not to the mobile-capable device. The packets decay or are dropped after use in the NAT component. Accordingly, the mobile-capable device expends no energy at all.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates connection management in a network boundary component 102. The system 100 includes the boundary component 102 for translating addresses and/or ports between disparate networks. The boundary component 102 facilitates a connection between a private client 104 of an internal network 106 (e.g., the internal network 106 having addresses as defined in RFC 1918) and an external network 108 (e.g., the Internet). The boundary component 102 can be a network address translation (NAT) device or network address port translation (NAPT) device, for example. As used herein, NAT will be used to refer to both NAT and NAPT devices.

The system 100 can also include a network keep-alive component 110 (e.g., a server, web server, application server) of the external network 108 for sending one or more unidirectional keep-alive packet(s) to the boundary component 102 and maintaining the connection to the private client 104 based on the keep-alive packet. In other words, only keep-alive packets received from the network component 110 are processed to reset a timeout timer of the boundary component 102.

In an alternative embodiment, keep-alive packets sent from the network component 110 are processed by the boundary component 102, but decay or self-destruct thereafter such that the private client 104 does not need to expend energy processing the packets. However, if the private client 104 is configured to expect receipt of the keep-alive packets, non-receipt thereof will trigger the client 104 to respond such that the boundary component 102 and/or the network component 110 issuing the keep-alive packets react accordingly (e.g., resend or issue alert).

In conventional approaches, keep-alive messages are bidirectional (perform round trip) such that the messages "hit" the NAT device (e.g., boundary component 102) twice-once from client (e.g., private client 104) to server (e.g., network component 110) and then from server to client. However, a substantial number of NAT devices refresh connection timeout state based on unidirectional messages coming from the Internet (e.g., server) as long as those messages reflect the appropriate 5-tuple associated with the connection (e.g., protocol number, source IP, source port, destination IP and destination port). This means that no acknowledgement is required from the client to confirm reception of the keep-alive packets, and therefore, reduced power consumption in a battery-powered client. To conserve battery life, the client can perform negative acknowledgement (NACK) if the server keep-alive message(s) are not received, but stay silent if the keep-alive messages are received.

An enhanced advanced mechanism can eliminate the need for the client to respond at all (e.g., eliminating the need for reception, positive acknowledgements or negative acknowledgements). Here, the keep-alive server identifies the NAT device (e.g., via an IP address), computes the nTTL (time-to-live), which is the minimal TTL for reaching the device (e.g., a simple way to compute this value is to compare the original TTL of a packet sent by the client with the TTL observed by the receiving server—assuming routes are symmetric, this value represents the TTL needed to deliver a packet in the reverse direction, from the server to the client). The server sets the TTL value on the keep-alive messages to nTTL-1 such that the packet is likely to be dropped due to TTL=0 before it hits the client. In Internet protocol (IP), a packet's TTL value determines how far (in terms of an approximate number of routers) this packet should travel before the packet is dropped. Each time the IP packet is processed through a router, its TTL value is decremented by 1. Eventually, when a packet is received with a TTL=0, it is not forwarded. The TTL mechanism prevents old or useless "zombie" packets from circulating unnecessarily over the network.

Excluding the client from any involvement has clear advantages: zero client battery drain or added transmission bits for keep-alive messages also means that the client is not sensitive to the frequency of the keep-alive messages. The server can send keep-alive messages more rapidly and improve overall resiliency.

Although, in this approach, there is no direct mechanism to confirm the successful NAT refresh operation, the reliability of wired networks is so high that there is virtually no need for an acknowledgement from the client—the server can send keep-alive messages according to a "fire-and-forget" mode. This is even more the case when the server substantially increases the frequency of keep-alive beyond the maximum NAT timeout. Note that the actual application data being sent via the boundary component 102 (or on the wire) serves as an implicit confirmation of the state of the connection. Moreover, the keep-alive mechanism described herein does not need to cover general connectivity failures such as the loss of GPRS (general packet radio service) connectivity as this is detected and handled by the client 104.

Figure 2:
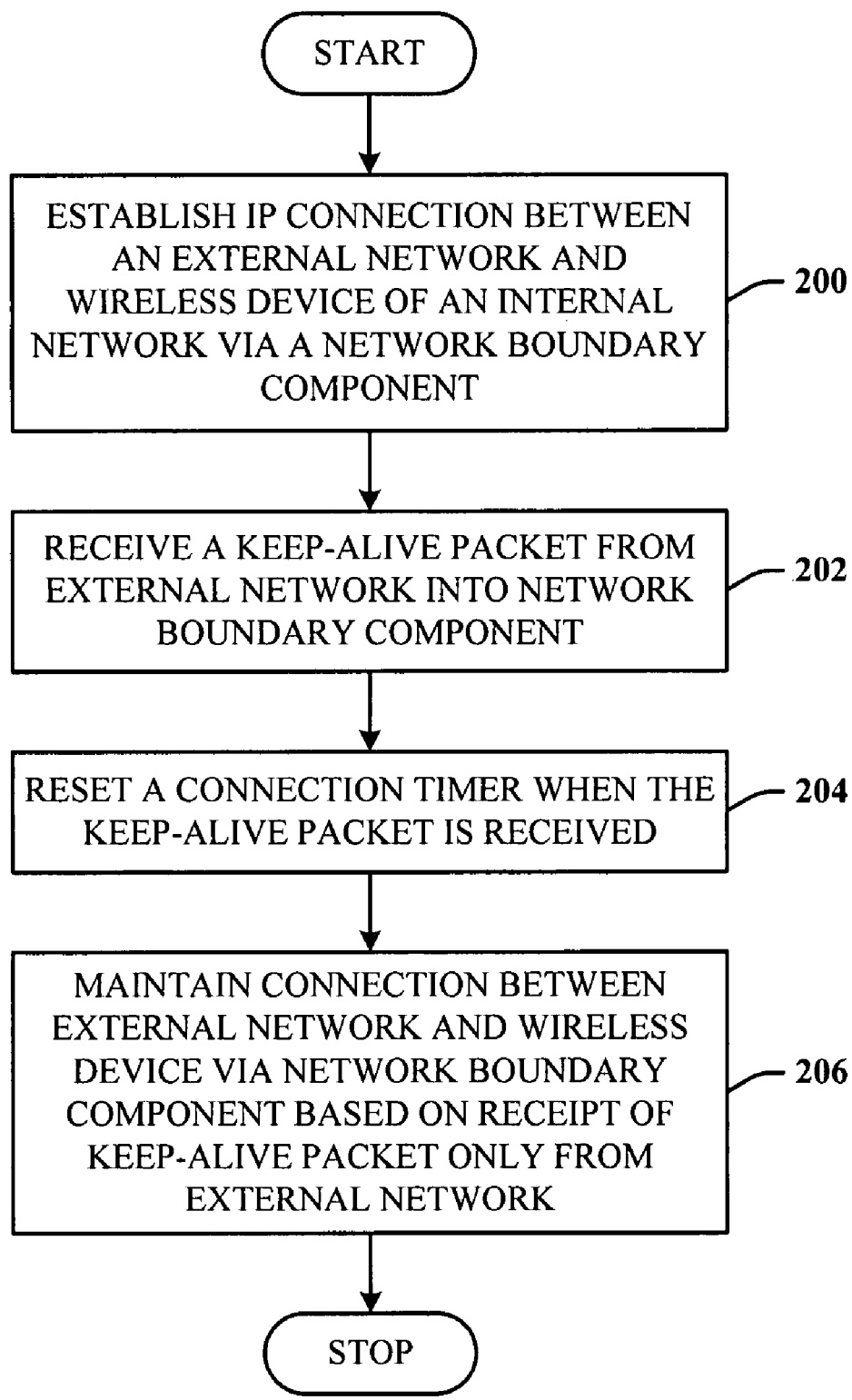
FIG. 2 illustrates a method of managing a communications connection in a network boundary component.

FIG. 2 illustrates a method of managing a communications connection. While, for purposes of simplicity of explanation, the one or more methodologies shown herein, for example, in the form of a flow chart or flow diagram, are shown and described as a series of acts, it is to be understood and appreciated that the subject architecture is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 200, a communications connection is established between an external network and a wireless device of an internal network via a network boundary component. At 202, a keep-alive packet is received from the external network into the network boundary component. At 204, a connection timer is reset based on the keep-alive packet. At 206, the connection between the external network and the wireless device via the network boundary component is maintained based on the keep-alive packet being received, and only from the external network. In other words, there is no longer any need to receive keep-alive packets from a source other than the external network. This means that the wireless device (e.g., a cell phone) running only on battery power will not need to be brought to a full power state to send or return keep-alive packets, as in conventional architectures. This conserves battery power, and reduces network traffic.

At least two types of keep-alive processes can be implemented: a first type (Type 1) where the keep-alive packets are sent by the server through to the private client, such that the client responds only when a keep-alive packet is not received; and a second type (Type 2), where the packets are terminated at the boundary component.

Figure 3:
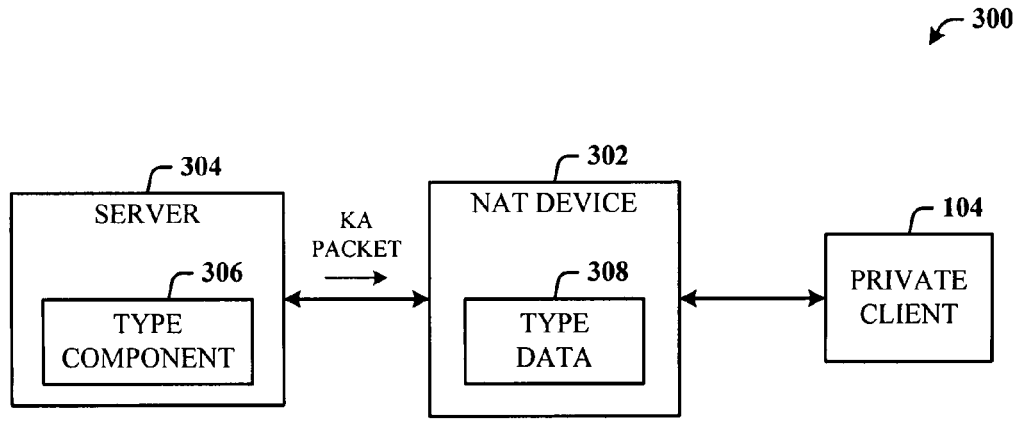
FIG. 3 illustrates an alternative system that employs type detection and selection based on interrogation of a NAT device by a server.

FIG. 3 illustrates an alternative system 300 that employs type detection and selection based on interrogation of a NAT device 302 by server 304. The server 304 includes a type component 306 for communicating with and reading type data 308 of the NAT device 302. For example, if the type data 308 indicates that the NAT device is a second type (or Type 2) device, where keep-alive packets are sent to the NAT device 302 and terminated such that no such packets are sent to the client 104. If not a Type 2 device, the server 304 automatically defaults to a Type 1 device where keep-alive packets are sent from the server 304 to the NAT device 302, and then to the client 104. If the client 104 fails to receive expected packets, the client 104 will respond with a NACK, for example, back to the server 304. The server 304 will then send additional keep-alive packets.

Figure 4:
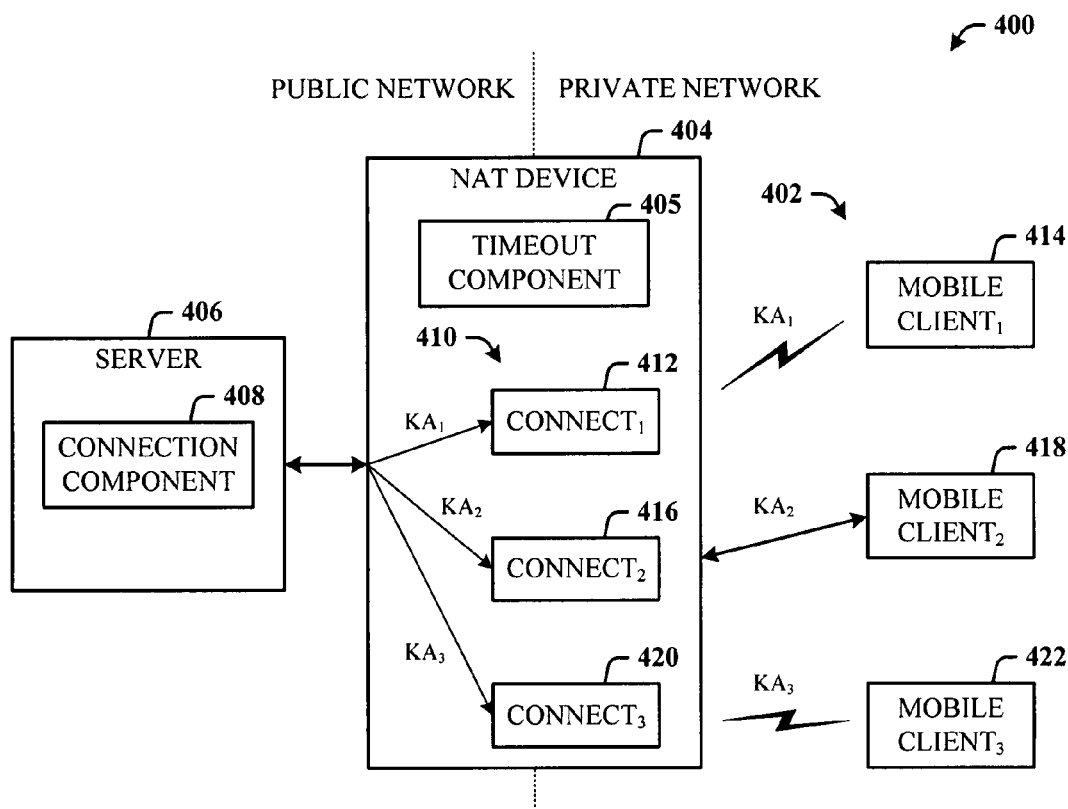
FIG. 4 illustrates a system for managing multiple NAT device connections.

FIG. 4 illustrates a system 400 for managing multiple NAT connections. Multiple battery-powered mobile clients 402 (denoted MOBILE CLIENT$_1$, MOBILE CLIENT$_2$ and MOBILE CLIENT$_3$) operate in the private network using NAT to communicate with the external network (e.g., the Internet and associated cellular networks) via a NAT device 404. A server 406 in the public network provides keep-alive packets via a server connection component 408 to the NAT device 404 to maintain one or more of connections 410 (denoted CONNECT$_1$, CONNECT$_2$ and CONNECT$_3$) operating via the NAT device 404. For example, the server 406 sends keep-alive packets (KA$_1$) to the NAT device 404 to maintain a first connection 412 for a first mobile client 414.

In this example, the first connection keep-alive packets KA$_1$ for the first connection 412 can be sent from the server 406 through the NAT device 404 to the first mobile client 414. Upon receipt of the packets, the NAT device 404 processes the packets such that a NAT timeout component 405 manages timeouts associated with the first connection thereby maintaining the first connection 412. At the first client 414, the first keep-alive packets KA$_1$ are expected by the first client 414 to be received. When the first client 414 detects that the keep-alive packets KA$_1$ are not being received, the first client 414 can send a NACK to the NAT device 404, and therefrom, to the server 406 indicating that the first keep-alive packets KA$_1$ are not being received. The server connection component 408 can then ensure that keep-alive packets KA$_1$ are being sent through the first connection 412. As illustrated, the first mobile client 414 is operating wirelessly with the NAT device 404 (e.g., a wireless router or gateway).

The NAT device 404 maintains a second connection 416 for a second mobile client 418 by receiving second keep-alive packets (KA$_2$). Upon receipt of the packets, the NAT device 404 processes the packets such that the NAT timeout component 405 manages timeouts associated with the second connection 416 thereby maintaining the second connection 416. The second packets KA$_2$ are forwarded to the second client 418 over a tethered connection (e.g., a USB-universal serial bus). Where this is an unpowered connection that does not charge or provide power to the client battery source, battery power conservation is desired. When the second client 418 detects that the keep-alive packets KA$_2$ are not being received, the second client 418 can send a NACK to the NAT device 404, and therefrom, to the server 406 indicating that the second keep-alive packets KA$_2$ are not being received. The server connection component 408 can then ensure that keep-alive packets KA$_2$ are being sent through the second connection 416. As illustrated, the second mobile client 418 is communicating over a tether, yet powered by the onboard battery source.

The NAT device 404 maintains a third connection 420 for a third mobile client 422 by receiving third keep-alive packets (KA$_3$). Upon receipt of the packets, the NAT device 404 processes the packets such that the NAT timeout component 405 manages timeouts associated with the third connection 620 thereby maintaining the third connection 420. The third packets KA$_3$ are forwarded to the third client 422 over a wireless connection. When the third client 422 detects that the third keep-alive packets KA$_3$ are not being received, the third client 422 can send a NACK to the NAT device 404, and therefrom, to the server 406 indicating that the third keep-alive packets KA$_3$ are not being received. The server connection component 408 can then ensure that third keep-alive packets KA$_3$ are being sent through the third connection 420. Here, the third keep-alive packets KA$_3$ are not forwarded from the NAT device 404 to the third client 422. The NAT device 404 operates to process the received third keep-alive packets KA$_3$ such that the packets KA$_3$ are terminated (or dropped or self destruct) at the private network interface precluding the third client 422 from receiving the packets KA$_3$. In support thereof, the NAT device 404 can be configured (e.g., in software) to automatically decrement the nTTL value of the keep-alive packet (after resetting the timeout component 405) at the private network interface to a value that causes the packet to be dropped before exiting the NAT device and reaching the third mobile client 422.

It is to be understood that although only one server, server 406, is shown, multiple servers can be employed to each send keep-alive packets for the corresponding connections to maintain NAT device state. For example, a first keep-alive server can be sending packets to maintain state for the first connection 412 and a second keep-alive server can be sending packets to the NAT device to maintain state for the second connection 416.

Figure 5:
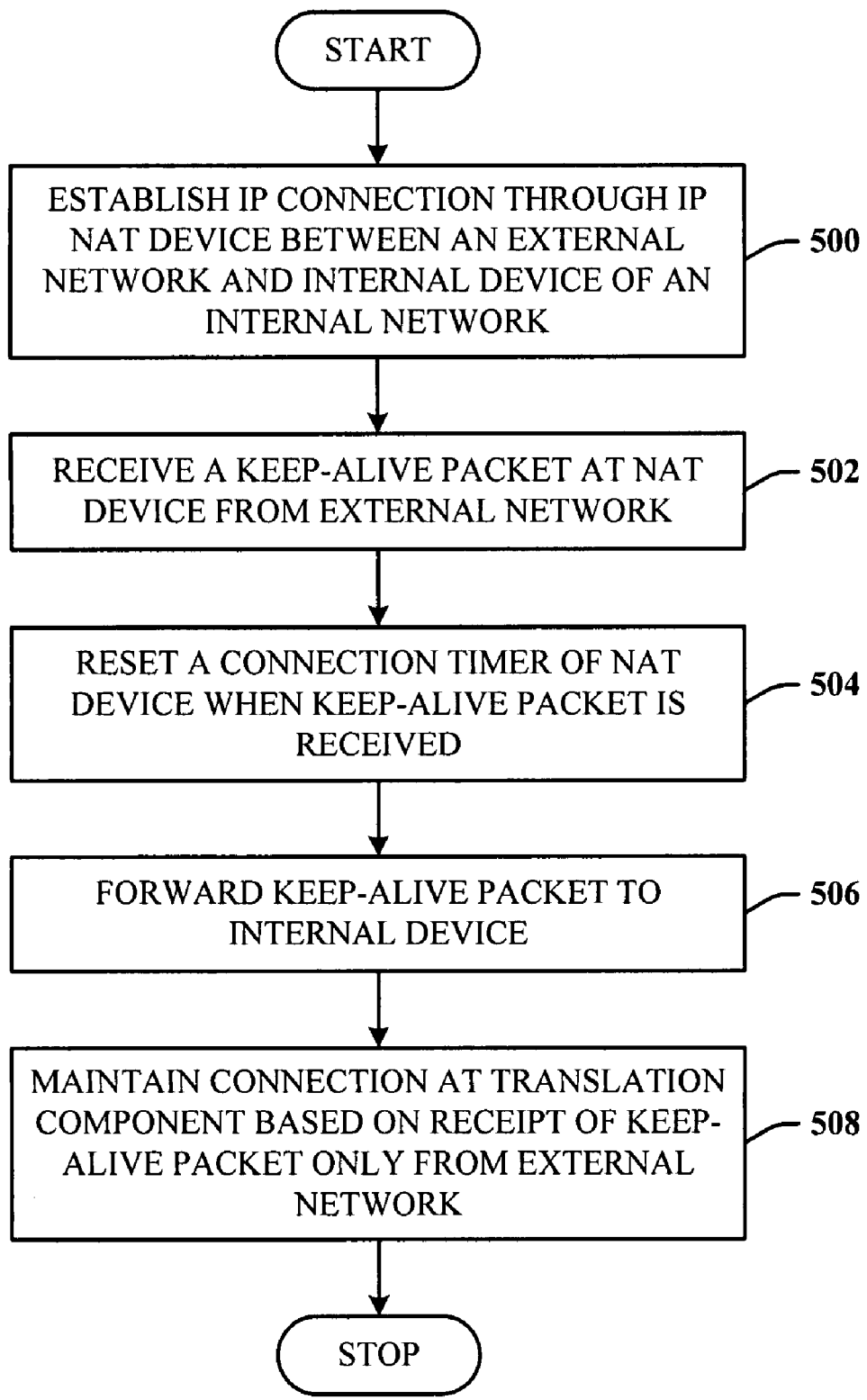
FIG. 5 illustrates a method of maintaining a connection using a NAT device.

FIG. 5 illustrates a method of maintaining a connection using a NAT device. At 500, an IP connection is established through a NAT device between an external network and an internal device of an internal network. At 502, a keep-alive packet is received at the NAT device from the external network. At 504, a connection timer in the NAT device is reset according to each receipt and processing of a keep-alive packet. At 506, the keep-alive packet is forwarded to the internal device. At 508, the connection is maintained at the NAT device based on receipt of the keep-alive packets being received only from the external network.

Figure 6:
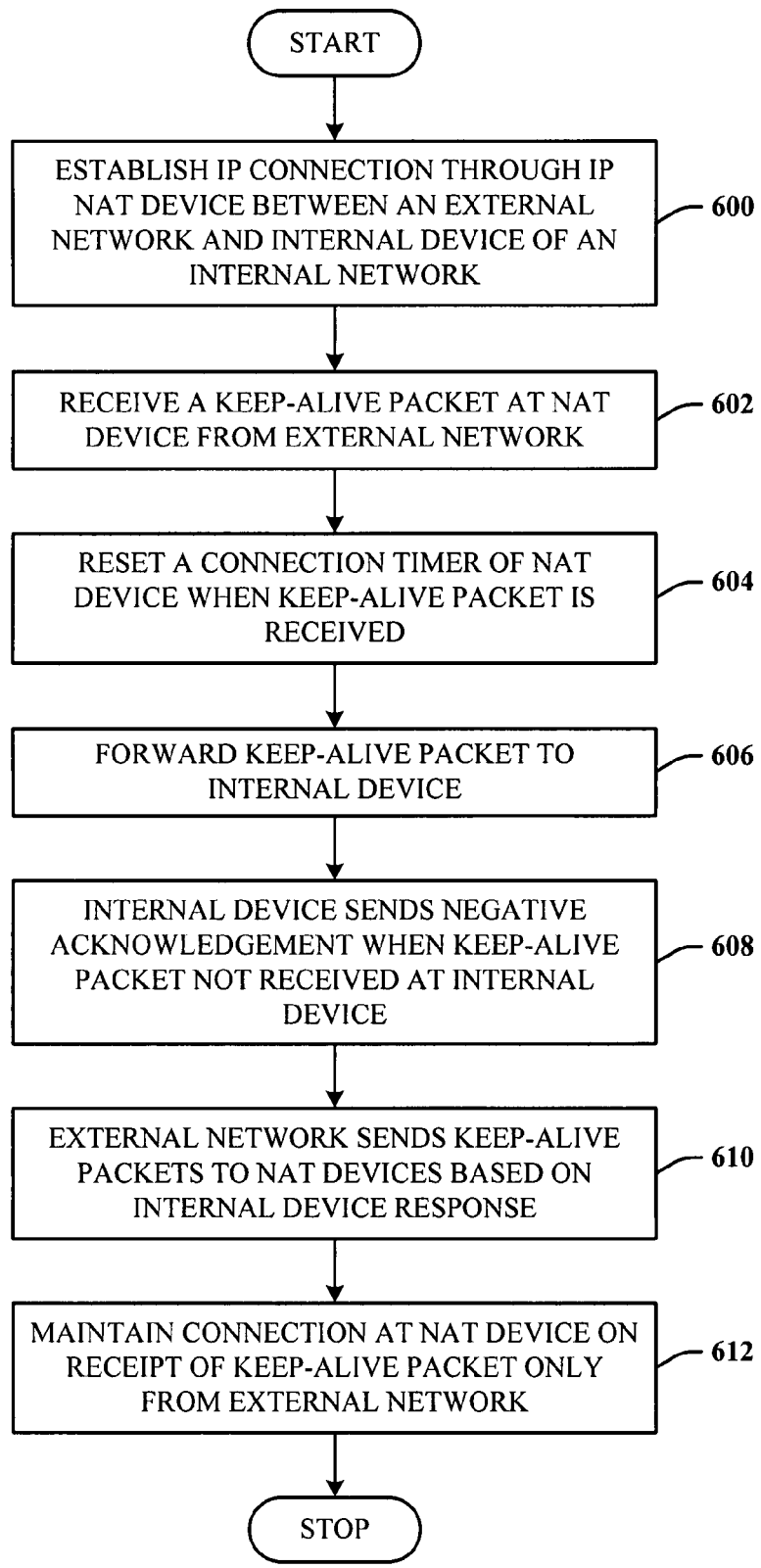
FIG. 6 illustrates a method of maintaining a connection using a NAT device and a NACK of an internal device.

FIG. 6 illustrates a method of maintaining a connection using a NAT device and a NACK of an internal device. At 600, an IP connection is established through a NAT device between an external network and an internal device of an internal network, the internal device operating on battery power. At 602, a keep-alive packet is received at the NAT device from the external network. At 604, a connection timer in the NAT device is reset according to each receipt and processing of a keep-alive packet. At 606, the keep-alive packet is forwarded to the internal device. At 608, the internal device sends a NACK only when a keep-alive packet is not received. At 610, the external network sends a keep-alive packet to the NAT device based on the NACK. At 612, the connection is maintained at the NAT device based on receipt of the keep-alive packets coming only from the external network.

Figure 7:
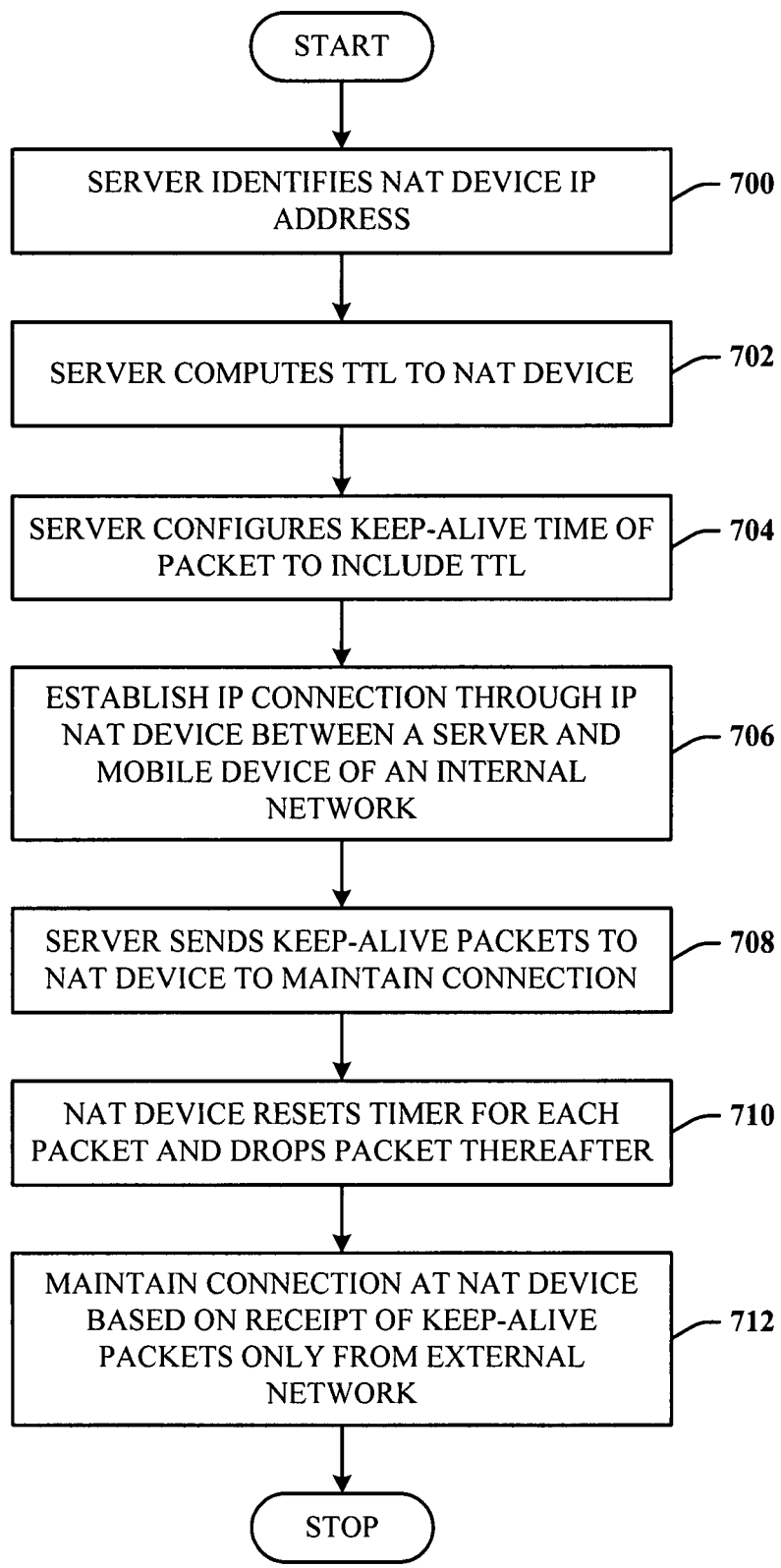
FIG. 7 illustrates a method of terminating packet life at the NAT device.

FIG. 7 illustrates a method of terminating packet life at the NAT device. At 700, an external server with keep-alive functionality identifies the NAT device IP address. At 702, the server computes the TTL to the NAT device. At 704, the server configures the keep-alive time of the packets to include the TTL. At 706, a communications connection is established through the NAT device between a communications server and mobiles device of an internal network. At 708, the server sends keep-alive packets to the NAT device to maintain the connection. At 710, the NAT device resets the NAT timer or each keep-alive packet received and drops or terminates the packets before the packets reach the mobile client. At 712, the connection is maintained at the NAT device based on receipt of keep-alive packets received only from the external server.

Figure 8:
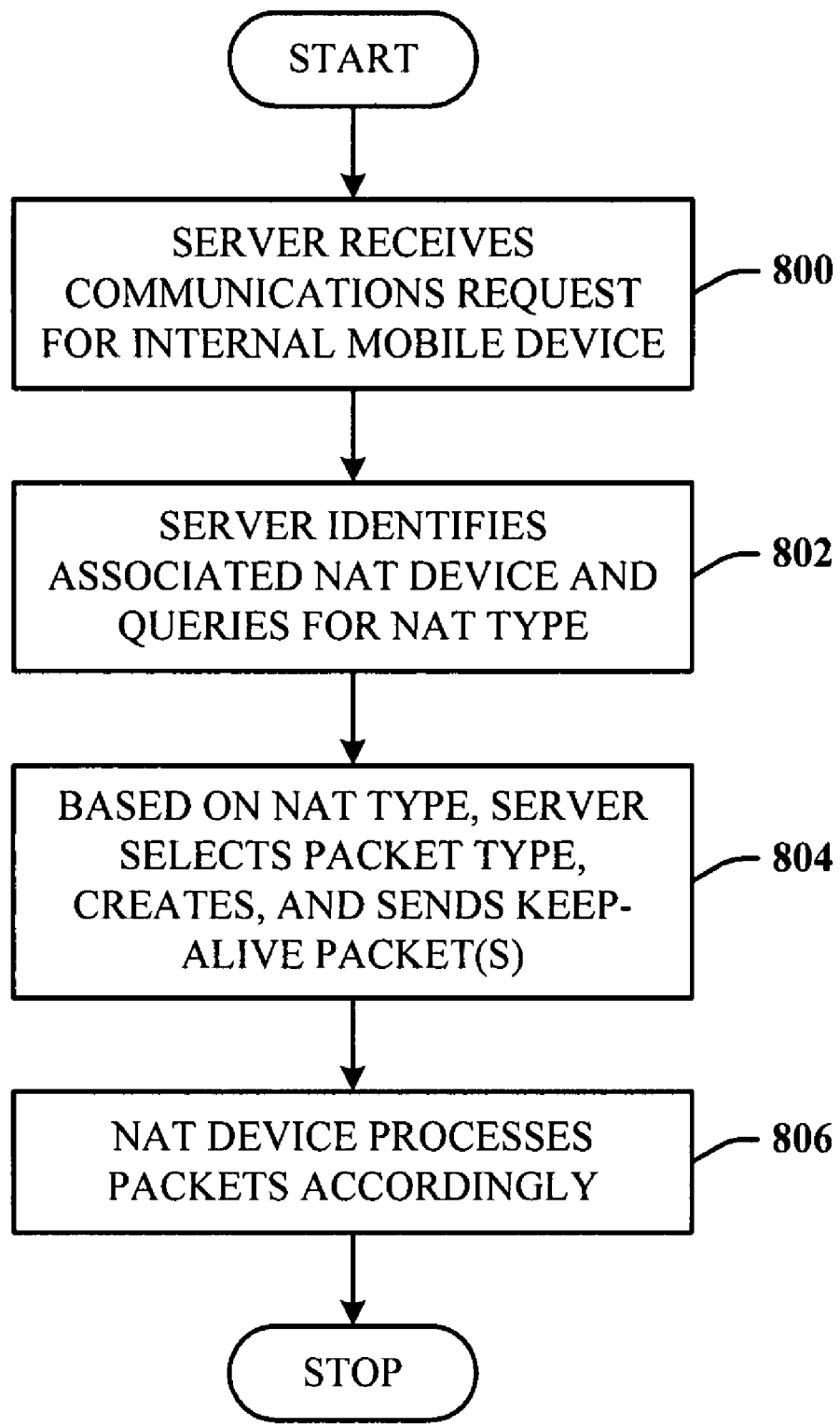
FIG. 8 illustrates a method of selecting keep-alive packet processing based on NAT device capabilities.

FIG. 8 illustrates a method of selecting keep-alive packet processing based on NAT device capabilities. At 800, a server receives a communications request for an internal mobile device. At 802, the server identifies the associated NAT device and queries for the device type (or capabilities). At 804, based on the NAT type, the server creates and sends keep-alive packets. At 806, the NAT device processes the packets accordingly, thereby maintaining the connection at the NAT device.

Figure 9:
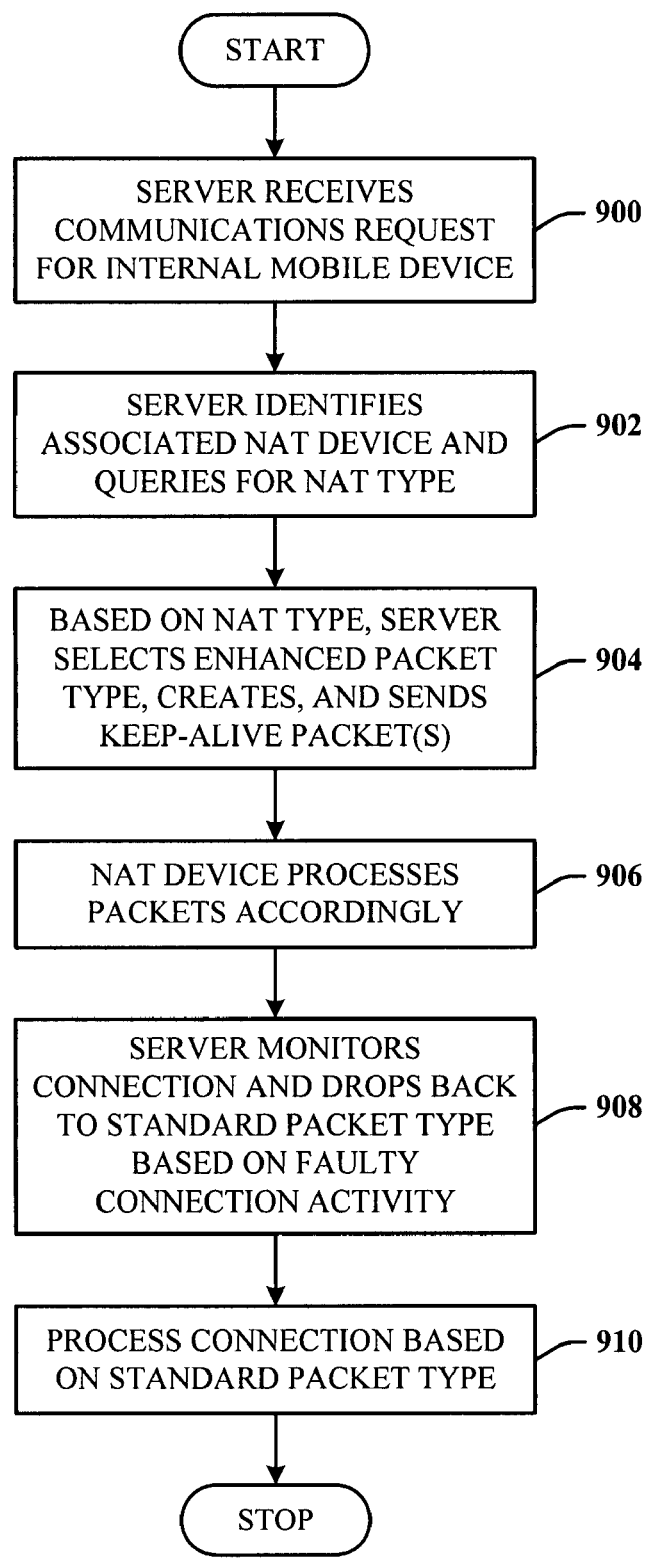
FIG. 9 illustrates a method of switching between keep-alive packet usage based on success or failure of the connection at the NAT device.

FIG. 9 illustrates a method of switching between packet usage based on success or failure of the connection at the NAT device. At 900, the server receives a communications request for an internal mobile device. At 902, the server identifies the associated NAT device and queries the device for the NAT type (e.g., Type 1 for packet pass-through and/or Type 2 for self-destructing packets). At 904, based on the NAT type (or capabilities), the server selects enhanced packet type (Type 2 self-destructing packets) for optimum battery conservation on the mobile device and, creates and sends self-destructing keep-alive packets. At 906, the NAT device receives and processes the packets for that connection, accordingly. At 908, the server monitors the connection and drops back to the standard packet type (Type 1) based on faulty connection activity. At 910, the connection is processed based on the standard packet type where the packets are passed through the NAT device to the mobile client. If the client fails to receive a packet, the client signals the server to keep sending keep-alive packets.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
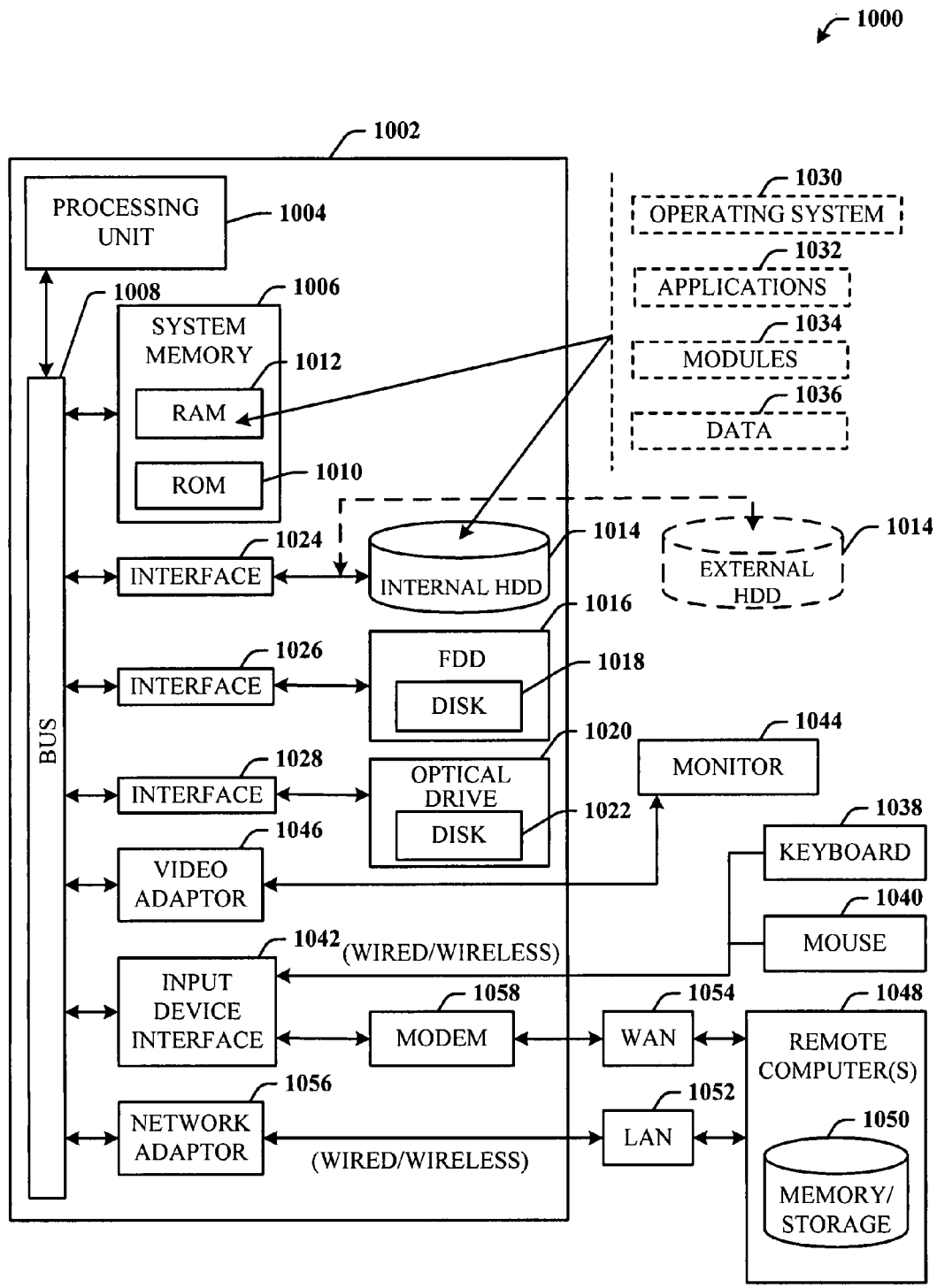
FIG. 10 illustrates a block diagram of a computing system operable to execute keep-alive packet processing in accordance the disclosed architecture.

Referring now to FIG. 10, there is illustrated a block diagram of a computing system 1000 operable to execute keep-alive packet processing in accordance the disclosed architecture. The computing system 1000 can function as the keep-alive server that issues the keep-alive packets to maintain the NAT device state, performs NAT interrogation to determine if the NAT can handle Type 1 or Type 2 processing, and switching between the NAT types, for example. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed architecture can be implemented with various commercially available operating systems or combinations of operating systems. The modules can include the type component 306 of FIG. 3 and the connection component 408 of FIG. 4, for example.

A user can enter commands and information into the computer 1002 through one or more wired/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 11:
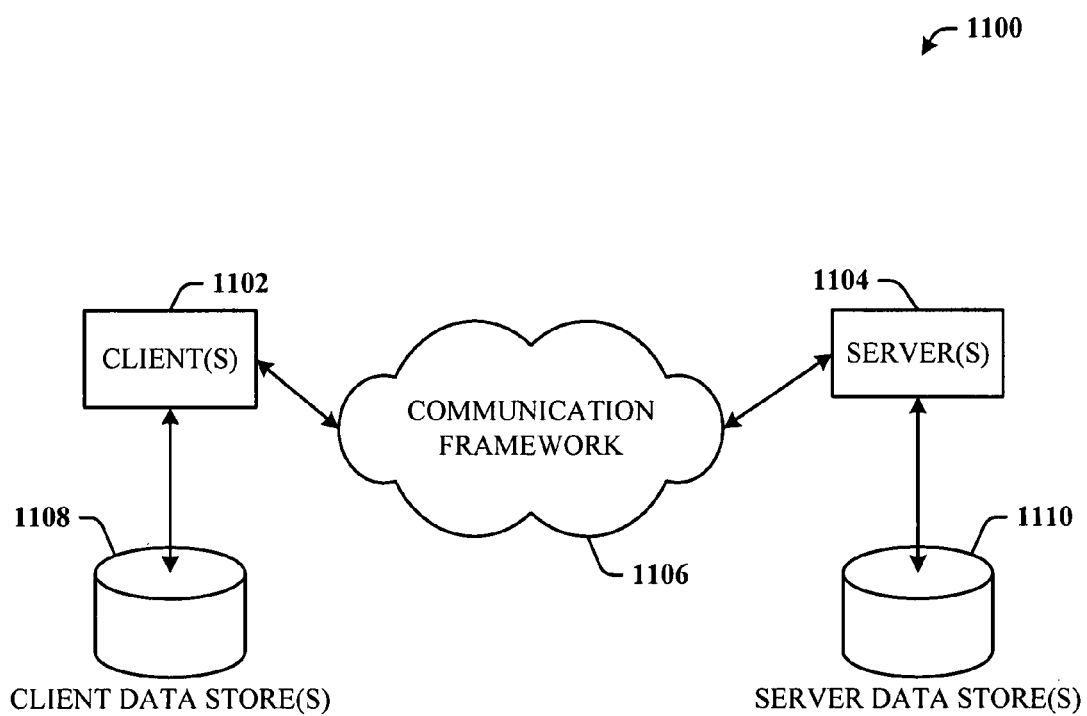
FIG. 11 illustrates a schematic block diagram of an exemplary computing environment for keep-alive packet processing in accordance the disclosed architecture.

Referring now to FIG. 11, there is illustrated a schematic block diagram of an exemplary computing environment 1100 for keep-alive packet processing in accordance the disclosed architecture. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The clients 1102 can include wired and/or wireless mobile-capable clients such as cell phones, smart phones, portable computers, and the like. The communications framework 1106 can include note only the Internet, but cellular networks to which the clients 1102 desire to communicate.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing a communications connection, comprising acts of:
    establishing an IP connection between an external network and a wireless device of an internal network via a network boundary device;
    receiving a keep-alive packet from the external network into the network boundary device;
    resetting a connection timer when the keep-alive packet is received;
    maintaining the IP connection between the external network and the wireless device via the network boundary device based on receipt of the keep-alive packet only from the external network;
    monitoring the IP connection of the network boundary device based on utilization of an enhanced keep-alive packet processing mode;
    automatically changing to a standard keep-alive packet processing mode based on reduced quality in connection state; and
    utilizing a processor that executes instructions stored in memory to perform the acts of establishing, receiving, resetting, maintaining, monitoring, and automatically changing.

2. The method of claim 1, further comprising receiving a response from the wireless device when the keep-alive packet is not received at the wireless device.

3. The method of claim 1, further comprising computing a time-to-live (TTL) value based on transit time of the keep-alive packet to the network boundary device and setting the TTL value in the keep-alive packet for dropping the packet.

4. The method of claim 1, further comprising configuring the keep-alive packet to include an nTTL value which when processed by the network boundary device terminates the keep-alive packet at the boundary device such that the wireless device does not receive the keep-alive packet.

5. The method of claim 1, further comprising interrogating the network boundary device, which is a NAT router, to determine if the router can handle enhanced keep-alive packet processing that drops the keep-alive packet before reaching the wireless client.

6. The method of claim 1, further comprising managing multiple connections of the boundary device concurrently by receiving keep-alive packets from the external network to maintain state of corresponding connections.

7. A system, comprising:
    means for establishing an IP connection between a public network and a mobile client of a private network;
    means for sending keep-alive packets to the means for establishing the IP connection;
    means for resetting a connection timer when the keep-alive packet is received;
    means for maintaining the IP connection between the external network and the mobile client via the means for establishing the IP connection based on receipt of the keep-alive packet only from the means for sending keep-alive packets;
    means for monitoring the IP connection based on utilization of an enhanced keep-alive packet processing mode; and
    means for automatically changing to a standard keep-alive packet processing mode based on reduced quality in connection state.

8. The system of claim 7, further comprising means for configuring the keep-alive packets to terminate before reaching the mobile client.

9. The system of claim 7, wherein the mobile client sends a negative acknowledgment when the keep-alive packet is not received.

* * * * *